United States Patent
Berbee et al.

(10) Patent No.: US 8,308,087 B2
(45) Date of Patent: Nov. 13, 2012

(54) LDPE TUBULAR REACTOR PEROXIDE MIXER

(75) Inventors: Otto J. Berbee, Hulst (NL); John T. Keating, Houston, TX (US); Gerrit Hommersom, Axel (NL); Larry A. Morse, Missouri City, TX (US); Werner Zschoch, Naumburg (DE)

(73) Assignee: Dow Global Technologies LLC, Midland, MI (US)

( * ) Notice: Subject to any disclaimer, the term of this patent is extended or adjusted under 35 U.S.C. 154(b) by 384 days.

(21) Appl. No.: 12/700,094

(22) Filed: Feb. 4, 2010

(65) Prior Publication Data
US 2010/0193607 A1 Aug. 5, 2010

Related U.S. Application Data

(60) Provisional application No. 61/150,172, filed on Feb. 5, 2009.

(51) Int. Cl.
*A62C 31/02* (2006.01)
(52) U.S. Cl. .................. 239/589; 239/433; 239/398
(58) Field of Classification Search .............. 239/589, 239/398, 433, 434, 434.5, 417.5, 419, 424.5, 239/584
See application file for complete search history.

(56) References Cited

U.S. PATENT DOCUMENTS

| | | | |
|---|---|---|---|
| 3,405,115 A | 10/1968 | Schappert et al. | |
| 4,931,225 A | 6/1990 | Cheng | |
| 6,117,406 A | 9/2000 | Vogel et al. | |
| 6,677,408 B1 | 1/2004 | Mahling et al. | |
| 6,951,908 B2 | 10/2005 | Groos et al. | |
| 2003/0122266 A1 | 7/2003 | Nau et al. | |

FOREIGN PATENT DOCUMENTS

| | | |
|---|---|---|
| EP | 0 449 092 A1 | 10/1991 |
| GB | 1 569 518 A | 6/1980 |
| GB | 2 175 708 A | 12/1986 |
| WO | WO-01/38219 A1 | 5/2001 |
| WO | WO-2005/065818 A1 | 7/2005 |

OTHER PUBLICATIONS

International Search Report (PCT/US2010/023151).

*Primary Examiner* — Davis Hwu

(57) ABSTRACT

The present invention provides an injection nozzle for mixing an initiator with a process fluid. Then injection nozzle comprises a body comprising an inlet port, and outlet port, and an injector inlet; a process fluid flow passage; an initiator flow fluid passage; and a stylus. The process fluid flow passage comprises a constricting portion and an expanding portion to help improve transport and mixing. The injection nozzle is useful for injecting a fluid into another fluid at elevated temperatures and pressures, and for maximizing mixing of the fluids.

9 Claims, 6 Drawing Sheets

FIG. 2A
FIG. 2B
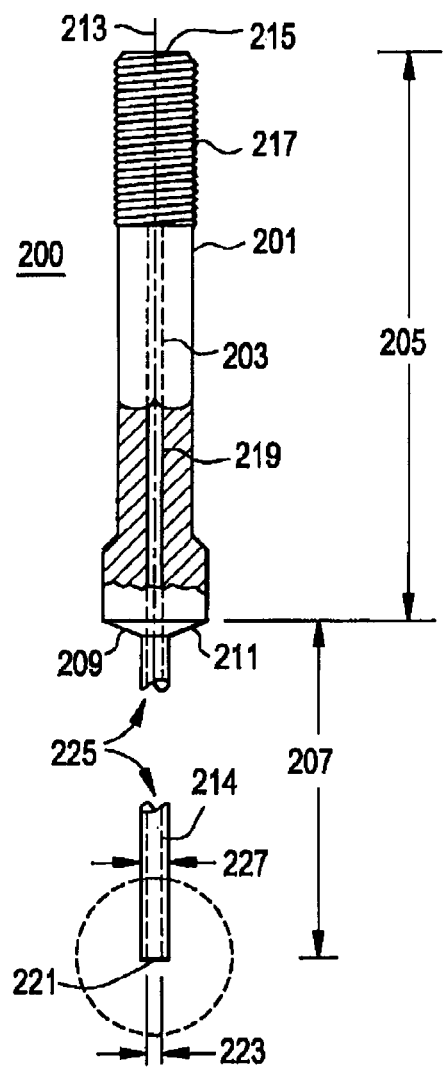
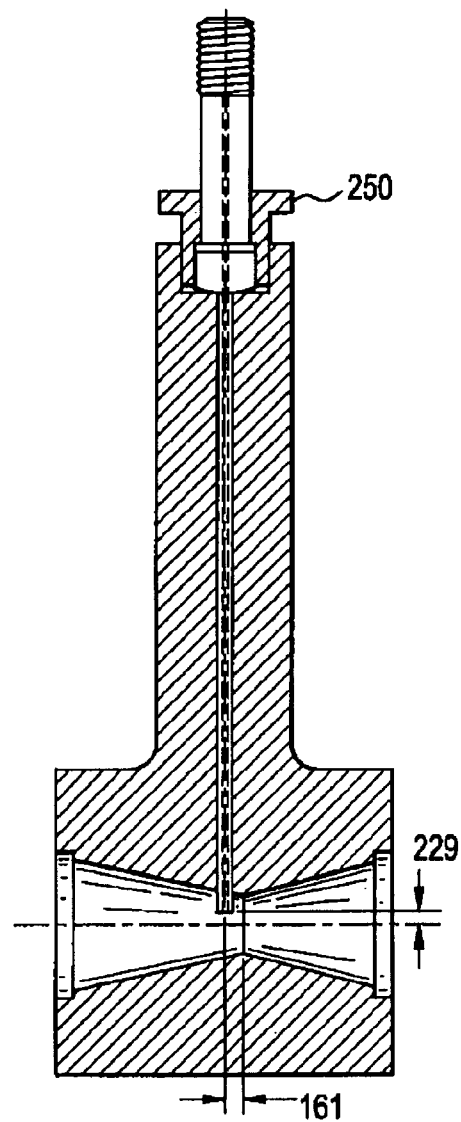

US 8,308,087 B2

LDPE TUBULAR REACTOR PEROXIDE MIXER

FIELD

The present invention relates to an apparatus useful for injecting a fluid into another fluid at elevated temperatures and pressures, and a system incorporating at least one such apparatus. More specifically, the present invention relates to an apparatus useful for injecting organic peroxides into a process fluid containing ethylene, and, optionally, one or more comonomers, to form a free-radical polymerized ethylene-based polymer product.

BACKGROUND

Methods are well known in the art for using a tubular reactor to form low density ethylene-based polymers from ethylene, and, optionally, one or more comonomers, such as low density polyethylene (LDPE). The overall process is a free-radical polymerization in a tube reactor containing a process fluid, where the process fluid partially comprised of ethylene and the ethylene is converted to an ethylene-based polymer in a highly exothermic reaction. The reaction occurs under high operating pressure (about 1000 bar to 4000 bar) in turbulent process fluid flow conditions at maximum temperatures of about 160° C. to about 360° C. The reaction initiation temperature, or the temperature in which the monomer (and optional comonomer) to polymer conversion is initiated (or in the case where there are multiple reaction points along the reaction tube, reinitiated), is from about 120° C. to about 240° C. Typical single-pass conversion values for a tubular reactor range from about 20 to about 40 percent.

The reaction is initiated (and reinitiated) by injecting an initiator into at least one reaction zone within the reactor tube. The initiator is mixed with the process fluid and, in the presence of heat (usually latent heat—the process fluid is typically already at an adequate reaction temperature), the initiator forms free-radical decomposition products. The decomposition products start a free-radial polymerization reaction with the ethylene (and optional comonomers) to form the product ethylene-based polymer.

The reaction generates a large quantity of heat in the reaction zones. Without proper cooling, the adiabatic temperature rise in the process fluid (which now contains product ethylene-based polymer that absorbs and retains heat) eventually results in unfavorable and possibly uncontrollable reactions. Such undesirable reactions may include ethylene decomposition (forming products such as carbon, methane, acetylene, and ethane), formation of high molecular weight polymer chains, and termination by combination and crosslinking, which may lead to a broadening of molecular weight distribution. The results of such undesirable reactions range from varying product quality and consistency issues to reaction system shutdown, venting, and cleanup.

Undesirable reactions may also occur when there is inadequate distribution of initiator in the process fluid. Under normal process operating conditions, initiator quickly breaks down into free-radical products after being injected into the process fluid. Dispersion of the initiator into the process fluid often results in a localized zone of high initiator concentration inside the process fluid flow. This localized initiator zone fosters an unbalanced reaction profile in the process fluid: greater amounts of polymerization and heat generation near the localized initiator zone and less elsewhere.

This unbalanced reaction profile may lead to process-related problems, such as high molecular weight material buildup near the initiator injection site, which may clog the injection port or the process fluid flow channel. It can also cause a buildup of high molecular weight material near the injection site or along the walls of the reaction tube that result in an occasional "sloughing off" of high molecular weight material. It can also lead, as previously mentioned, to ethylene decomposition. If a significant concentration of fresh initiator contacts the wall of the reactor tube in the reaction section (where temperatures are elevated), the initiator may decompose and quickly react, starting a localized reaction "hot spot" that may propagate into full blown system-wide decomposition.

Various attempts have been made to enhance the mixing of an injected material into a process fluid stream through various nozzle configurations and other system changes. Great Britain U.S. Pat. No. 1,569,518 (Kita, et al.) describes using mechanical restrictions—static inline mixers—to create a turbulent flow. U.S. Pat. No. 3,405,115 (Schapert, et al.) describes something akin to a sparger where gas streams are split, a catalyst is injected in one stream, and the gas streams recombined. PCT Patent Publication No. WO 2005/065818 (Hem, et al.) describe a non-circular reaction tube profile. U.S. Pat. No. 6,677,408 (Mahling, et al.) describes a dog-bone constriction with in-line blades used to generate two counter-spinning gas flows upstream of an initiator injection site. U.S. Pat. No. 6,951,908 (Groos, et al.) has "swirl elements" for introducing initiator into the reaction system. European Published Application No. 0449092 (Koehler, et al.) describes an general injection nozzle.

SUMMARY OF INVENTION

In an embodiment of the invention, an initiator injection nozzle for mixing an initiator with a process fluid may comprise a body that further comprises an inlet port to receive the process fluid, an outlet port, and an injector inlet to receive initiator; a process fluid flow passage through which the process fluid traverses between the inlet port and outlet port along a central process flow axis, further comprising a constricting portion, a throat, and an expanding portion in that order; an initiator fluid flow passage through which the initiator traverses between the injector inlet and an injector outlet along an injector central vertical axis, where the initiator fluid flow passage intersects the process fluid flow passage in the constricting portion; a stylus at least partially containing the initiator fluid flow passage and further comprising a shaped injector tip forming the injector outlet of the initiator fluid flow passage; where the injector outlet is located in the constricting portion of the process fluid flow passage and upstream of the throat by a horizontal offset as determined along the central process flow axis; and where the injector outlet is located off the central process flow axis by a vertical offset as determined along the injector central vertical axis.

In other embodiments of the invention, a ratio of the horizontal offset to the vertical offset is from about 1.0 to about 10. In other embodiments, a ratio of the radius of the throat minus the vertical offset to the radius of the throat is from about 0.45 to about 0.90. In other embodiments, the expanding portion angle is from about 23 to about 48 degrees. In other embodiments, a ratio of the expanding portion angle to the constricting portion angle is from about 1.0 to about 3.0.

In other embodiments of the invention, the shaped injector tip comprises a needle-like shape. In some other embodiments, the shaped injector tip comprises a squared needle-like shape. In some other embodiments, the shaped injector tip comprises a rounded or domed-like shape. In some other embodiments, the shaped injector tip comprises a In some other embodiments, the shaped injector tip is beveled.

In an embodiment of the invention, a tube reactor system containing a process fluid, comprises at least one fresh feed source for supplying ethylene into a process fluid, a primary compressor for pressurizing the process fluid to reaction conditions in fluid communication with both the at least one fresh feed source and a recycle conduit, a reactor tube for converting a portion of the ethylene and optionally at least one comonomer within the process fluid into a low density ethylene-based polymer and a remaining portion of ethylene in fluid communication with the primary compressor, a high pressure separator for separating the low density ethylene-based polymer from the remaining portion of ethylene in fluid communication with the reactor tube, and the recycle conduit in fluid communication with the high pressure separator for conveying the remaining portion of ethylene to the primary compressor; where the improvement comprises a reactor tube that further comprises at least one initiator injection nozzle in fluid communication with an initiator source containing initiator and the process fluid, where the at least one initiator injection nozzle comprises a body that further comprises an inlet port to receive the process fluid, an outlet port, and an injector inlet to receive initiator; where the at least one initiator injection nozzle further comprises a process fluid flow passage through which the process fluid traverses between the inlet port and outlet port along a central process flow axis, that further comprises a constricting portion, a throat, and an expanding portion in that order; where the at least one initiator injection nozzle further comprises an initiator fluid flow passage through which the initiator traverses between the injector inlet and an injector outlet along an injector central vertical axis, where the initiator fluid flow passage intersects the process fluid flow passage in the constricting portion; and where the at least one initiator injection nozzle further comprises a stylus at least partially containing the initiator fluid flow passage and further comprising a shaped injector tip forming the injector outlet of the initiator fluid flow passage; where the injector outlet is located in the constricting portion of the process fluid flow passage and upstream of the throat by a horizontal offset as determined along the central process flow axis; and where the injector outlet is located off the central process flow axis by a vertical offset as determined along the injector central vertical axis.

FIGURES

The foregoing summary as well as the following detailed description will be better understood when read in conjunction with the appended figures. It should be understood, however, that the invention is not limited to the precise arrangements and instrumentalities shown. The components in the drawings are not necessarily to scale, with emphasis instead being placed upon clearly illustrating the principles of the present invention. Moreover, in the drawings, like reference numerals designate corresponding parts throughout the several views.

FIGS. 1(a) through (d) are schematic views of (a) front, (b) side, (c) an axial cross-section, and (d) a magnified portion of the axial cross-section of a lens tee portion 100 of an embodiment initiator injection nozzle.

FIGS. 2(a) and (b) are schematic views of (a) side with a partial cross-section of an injector portion 200 or an embodiment initiator injection nozzle, and (b) a side view of an injector portion 200 coupled to an axial cross-section of the lens tee portion 100 of an embodiment initiator injection nozzle. FIGS. 2(c), (d), (e), and (f) are schematic views various shaped injector tips 221, including (c) needle-like shape, (d) squared needle-like shape, (e) rounded or domed-like shape, and (f) beveled.

Figure 1A:
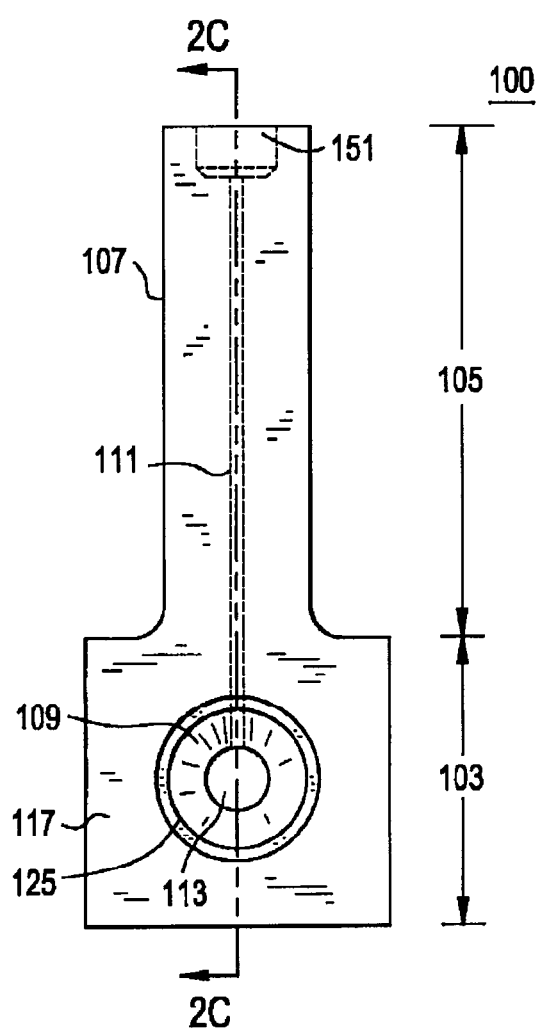

Other aspects and advantages of embodiment initiator injection nozzles will be apparent from the following description and the appended claims.

DETAILED DESCRIPTION

The following discussion is presented to enable a person of ordinary skill and creativity in the art to make and use the disclosed invention within the scope of the appended claims. The general principles described may be applied to embodiments and applications other than those detailed below without departing from the spirit and scope of the present inventions as defined by the appended claims. The present invention is not intended to be limited to the embodiments shown, but is to be accorded the widest scope consistent with the principles and features disclosed.

None of the prior art references indicate the use of a nozzle to establish a turbulent zone of mixing immediately downstream of an initiator injection site to maximize initiator mixing. None of the prior art references optimize the position of an initiator injection site position relative to the center of the process fluid flow to ensure maximum dispersion of the initiator in the process fluid flow upon entering the turbulent zone of mixing.

Embodiment initiator injection nozzles use a Ventui-type shape process fluid flow channel to help provide extremely fast initiator dispersion in the process fluid. In combination, a constricting and an expanding portion of a process fluid flow channel are designed to quickly move the process fluid through the initiator injection area by compression of the process fluid and then creation of a highly turbulent wake by expansion of the process fluid. None of the embodiment initiator injection nozzles use mechanical restrictions or devices to create drag or turbulence in the process fluid flow. Mechanical restrictions in the process fluid flow create drag which allows for the formation of high molecular weigh polymers. High molecular weigh polymers form in areas of low process fluid flow that contain relatively high levels of initiator concentration and elevated temperatures. The constricting portion upstream of the throat and the expanding portion downstream of the throat are preferably optimized to maintain mixing capability of the initiator into the process fluid while providing the least flow restriction possible.

It is believed that at the solid-fluid interface on the inside of a tubular reactor, such as between the tube wall and the process fluid, the velocity of the process fluid is relatively low compared to the average process fluid velocity due to surface friction or drag. Drag can also be caused by in-line objects resulting in unbalanced fluid flow, such as by an injection tube or port. See Vliet, E. van, Derkesen, J. J., and van den Akker, H. E. A., "Turbulent Mixing in a Tubular Reactor: Assessment of an FDF/LES Approach", AIChE Journal, 725-39, Vol. 51, No. 3 (March 2005). Low process fluid velocity near the tube walls or behind in-line objects results in the formation of boundary layers near the surface of the walls or objects. In this boundary layer, the process fluid flow becomes laminar (non-turbulent) and is typically referred to as a viscous sublayer. Within the viscous sublayer, because it is slow moving and not well mixed (it is non-turbulent), the monomer and newly formed polymer chains are exposed to longer reactor residence times, meaning additional exposure to elevated process reaction temperatures and chemical initiators. The longer reactor residence times results in an increased likelihood of forming high-molecular weight polymer chains in this viscous sublayer. At high average process fluid velocities or by the introduction of turbulent flow, the build up of highly viscous, high molecular weight polymer chains in a viscous sublayer may be minimized as the boundary layer near the tube wall or the in-line object is smaller and faster moving or turbulently disrupted. See McCabe, Warren L, et al., *Unit Operations of Chemical Engineering*, 56-58, McGraw-Hill, Inc. (5th ed., 1993).

The turbulence generated by the expansion of a compressed process fluid provides for the suppression of the laminar flow layers near the tube wall in the zone of mixing. This has been found to be highly preferred in the area of the reactor tube where the highest relative concentration of initiator exists. The turbulence created by the embodiment initiator injection nozzle significantly reduces the probability of undesirable chemical reactions from occurring based upon improper mixing.

Prior art initiator injectors where the initiator is simply passed through a hole in the wall of the nozzle into the process fluid, where an initiator nozzle does not protrude far enough into the process fluid flow, or where the nozzle itself creates excessive drag that affects downstream mixing of the initiator into the process fluid provides for uneven distribution of initiator in the process fluid. The uneven and inaccurate distribution of initiator at normal process conditions may lead to lower-than-expected ethylene conversion efficiency, broader molecular weight distribution of the resultant polymer, excessive high molecular weight polymer formation resulting in system fouling, and even process upsets by runaway reactions and decompositions.

Embodiment initiator injection nozzles have an injector tube with a shaped injector tip that protrudes into the process flow for injecting initiator into the process fluid. It is preferred in embodiment initiator injection nozzles that the shaped injector tip is positioned upstream of the throat in the constricting portion of the process fluid flow channel. It is also preferred that the injector tube injector tube extends into the process fluid flow channel so that the shaped injector tip is far enough away from the wall of the constricting portion so that the initiator does not interact with the wall of the constricting portion and that the initiator injected into the process is proximate to the center of the process fluid flow upon discharge, but not so far into the process fluid flow so that a wake downstream of the injector tube does not significantly impact the direction of the process fluid flow. It has been found that a balance can be struck between these competing interests by extending the injector tube far enough into the process fluid flow so that the shaped injector tip is close to, but not on or past, the center of the process fluid flow, and that the injector tube is upstream of the throat far enough to compensate for its drag effect on the process fluid as the process fluid approaches the throat but not so far away as to permit the initiator from decomposing and initiating the free-radical polymerization reaction before reacting the turbulent mixing zone. The preferred location of the injector tube is upstream of the throat of the Venturi nozzle in the constricting portion along the process fluid flow axis a positive distance, and for the shaped injector tip to be proximate to, but not in or beyond the center of, the process fluid flow.

The combined effect of the structure of embodiment initiator injection nozzles is that as the process fluid is constricted the initiator is injected proximate to the center of the process fluid flow. As the process fluid with initiator traverses the throat, the initiator is concentrated in the center of the flow and away from the walls of the injection nozzle. As the process fluid expands in the expansion section, the concentration of initiator in the center of the flow is quickly distributed within a turbulent flow regime in all directions.

The turbulent mixing and rapid dispersion of the initiator in the process fluid using the initiator injection nozzle has several positive benefits not seen in the prior art. By minimizing the laminar zones near the high concentration of initiator, the formation of high molecular weight polymer chains is restricted. Minimizing the formation of insulative layers of polymer made from high molecular weight polymer chains improves overall heat transfer efficiency. High-molecular weight polymers chains tend to "plate out" of the process and coat the inside of reactor tubes or process vessels near reaction zones. Ethylene-based polymers such as LDPE are very good thermal insulators. The formation of an internal lining of a tubular reactor or a process vessel of high-molecular weight ethylene-based polymer will result in either lower heat removal ability (resulting in higher adiabatic process temperatures) or greater energy inefficiency by having to use more energy to create a higher temperature differential (the temperature differential also known as a "delta T" or "ΔT") across the reactor (i.e., lower inlet cooling temperature to drive a higher heat flux through the insulated reactor tube).

In conjunction with the improvement in heat transfer capability, additional initiator can be used with the initiator injection nozzle to improve the single-pass conversion efficiency of the process. For process safety considerations, the amount of initiator injected into the system is restricted based upon peak process temperatures. This temperature-based restriction results in a limitation of the overall amount of ethylene that can be converted in a single pass of process fluid through the reaction system. When the production of high molecular weight polymer chains is minimized, the buildup of polymer insulation layers is restricted, thereby improving heat removal capability. Improved heat removal capacity permits a greater amount of initiator to be used to reinitiate the process and increase conversion efficiency using the same peak process temperature limitations.

Embodiment initiator injection nozzles may take the form of one component or as an assembly of several components. For purposes of highlighting features and aspects of the invention, an embodiment initiator injection nozzle made of two components—a lens tee portion 100 and an injector portion 200—is described. It is understood by one of ordinary skill and creativity in the art that the features and aspects of the invention may all be included in a single component or multi-component embodiment of the disclosed initiator injection nozzle, and that features and aspects of the invention may appear on different components than described.

In describing the various attributes of embodiment initiator injection nozzles, the terms "upstream" and "downstream" as used are spatially relative terms referencing the general direction of flow of process fluids, streams, and products through a high pressure low density polyethylene production system, especially a tubular reactor system. Typically, "upstream" begins with a source of fresh monomer/comonomer feeds and "downstream" ends through finished polymer storage facilities, unless another meaning is clear from the context. Process fluid flows from an upstream position to a downstream position, unless otherwise noted. Upstream and downstream may also be used to describe relative position in a piece of equipment, where process fluids, streams, and products enter through an upstream entryway or port and exit through a downstream egress.

Figure 1B:
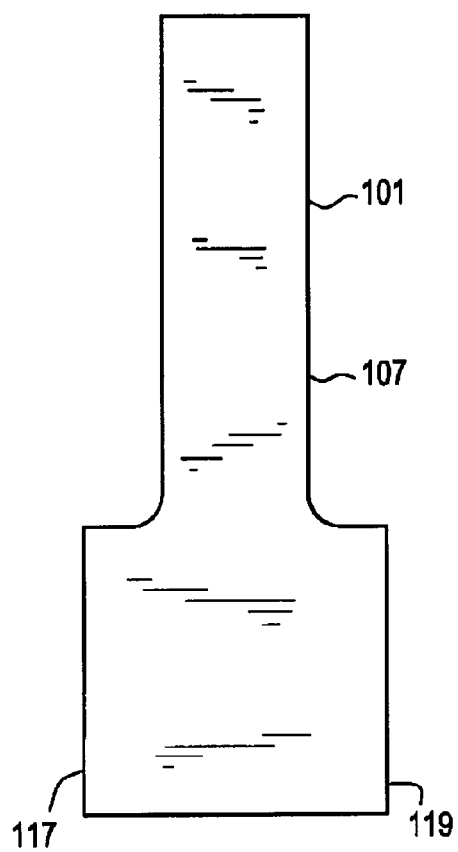
Figure 1C:
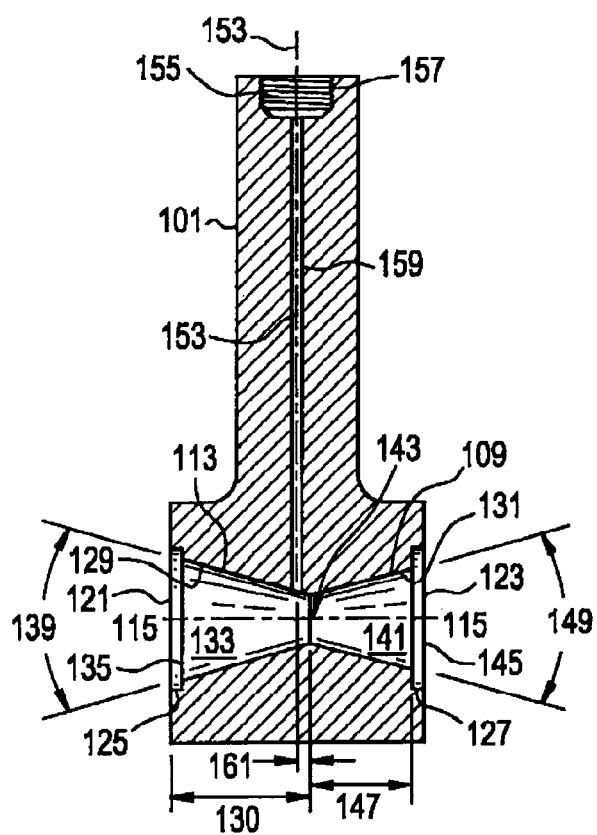

FIGS. 1(a)-(c) show a front, side, and an axial cross-section, respectively, of an lens tee portion 100 of an embodiment initiator injection nozzle. The lens tee portion 100 may be comprised of an inverted "T" shaped body 101 as viewed from the side view with a block section 103 and a shaft section 105, although generally other shapes and configurations may be used. The body 101 has an outer wall 107, a block inner wall 109 in the block section 103, and a shaft inner wall 111 in the shaft section 105. The thickness of the body 101 between the outer wall 107 and the inner walls 109 and 111 at various positions of the lens tee portion 100 will vary and are reflective of the material of construction of the body 101, the operational service pressures and temperatures the lens tee portion 100, and the service provided by the inner walls 109 and 111. It is preferred that the body 101 be fabricated from a single piece of metal.

As viewed using FIG. 1(c), the block inner wall 109 forms a process fluid flow passage 113 along a central process flow axis 115 from an inlet end 117 to an outlet end 119 of the block section 103 of the body 101. Process fluid traverses the process fluid flow passage 113 between an inlet port 121 and an outlet port 123 along the central process flow axis 115. The block inner wall 109 is circularly-sectioned.

In some embodiments, the block inner wall 109 includes an inlet fitting lip 125 that is substantially cylindrical and that extends downstream into the block section 103 from the inlet port 121. The dimensions of the inlet fitting lip 125 may vary according to the outer diameter and thickness of the reactor tube connected to the lens tee portion 100 at that point and the manner of connection (for example, welding, flange, screw coupling), although a weld connection is preferred. In some embodiments, the block inner wall 109 also includes an outlet fitting lip 127 that is substantially cylindrical and that extends upstream into the block section 103 from the outlet port 123. The dimensions of the outlet fitting lip 127 may vary for similar reasons as the inlet fitting lip 125. In some embodiments, the dimensions of the inlet fitting lip 125 and the outlet fitting lip 127 are different.

The block inner wall 109 in some embodiments includes an entry portion 129 that is substantially cylindrical and extends downstream into the block section 103 from an inlet fitting lip 125. In some embodiments, the block inner wall 109 also includes an exit portion 131 that is substantially cylindrical and extends upstream into the block section 103 from an outlet fitting lip 127. In some embodiments, the diameter of the entry portion 129 is substantially similar to the internal diameter of the inlet reactor tube, providing an even surface along the block inner wall 109 at the interface. In some embodiments, the diameter of the exit portion 131 is substantially similar to the internal diameter of the outlet reactor tube.

A constricting portion 133 extends axially downstream from the entry portion 129. In embodiments with an entry portion 129, the entry portion 129 and the constricting portion 133 meet at a first circular intersection 135, which is normal to the central process flow axis 115. The constricting portion 133 is preferentially frusto-conical, with a diameter which decreases as it extend axially downstream from the entry portion 129. The constricting portion 133 has a constricting length 137 as measured along the central process flow axis 115 from the first circular intersection 135 to a throat 143 from about 40 millimeters to about 60 millimeters. The constricting portion 133 also has a constricting portion angle 139, which can be measured as the angle formed by opposing sides of the block inner wall 109 in the constricting portion 133, from about 15 to about 40 degrees.

The constricting portion 133 meets with an expanding portion 141 at the throat 143, which is normal to the central process flow axis 115. The diameter of the throat 143 may vary from about 15 to about 37 millimeters. The ratio of the diameter of the first circular intersection 135 to the throat 143 is from about 1.4 to about 2.7, and preferably from about 2.0 to about 2.2.

The expanding portion 141 extends axially downstream from the throat 143. The expanding portion 141 is also preferentially frusto-conical, with a diameter which increases as it extend axially downstream from the throat 143 to the exit portion 131. The exit portion 131 and the expanding portion 141 meet at a second circular intersection 145, which is normal to the central process flow axis 115, in embodiments that have an exit portion 131. The expanding portion 141 has an expanding length 147 as measured along the central process flow axis 115 from the throat 143 to the second circular intersection 145 from about 15 millimeters to about 40 millimeters. The expanding portion 141 also has an expanding portion angle 149, which can be measured as the angle formed by opposing sides of the block inner wall 109 in the expanding portion 141, from about 23 to about 48 degrees.

In all embodiments, the process fluid flow passage 113 comprises a constricting portion 133, a throat 143, and an expanding portion 141 in that order based upon flow of the process fluid from an upstream position to a downstream position relative to the initiator injection nozzle.

In some embodiments, and as shown in the embodiment of FIG. 1(c), the constricting portion 133 and the expanding portion 141 are asymmetrical in that they are not similar along both sides of the throat 143. In some embodiments, as in the embodiment as shown in FIG. 1(c), the constricting length 137 is not the same as the expanding length 147. In preferred embodiments, the constricting length 137 is greater than the expanding length 147. In such embodiments, the ratio of the constricting length 137 to the expanding length 147 is from about 1.3 to about 3.0, and more preferably from about 1.3 to about 1.8. In some embodiments, as in the embodiment as shown in FIG. 1(c), the expanding portion angle 149 is greater than the constricting portion angle 139. The ratio of the expanding portion angle 149 to the constricting portion angle 139 may vary from about 0.97 to about 3.0, and preferably from greater than 1.0 to about 3.0.

Figure 1D:
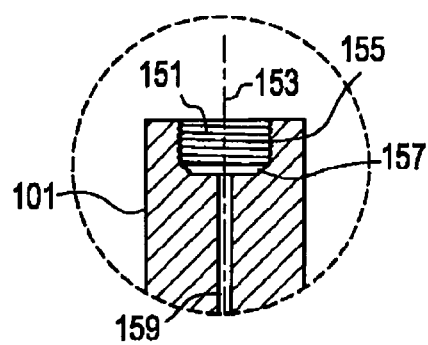

In some embodiments, the shaft inner wall 111 forms an injector recess 151 along a shaft vertical axis 153 into the shaft section 105. The shaft vertical axis 153 intersects with and is perpendicular to the central process flow axis 115, and is preferentially centered in the shaft section 105. An example of such an injector recess 151 area is shown in FIG. 1(c) and magnified in FIG. 1(d). The dimensions and configuration of the injector recess 151 may vary according to the dimensions and manner of connection (for example, welding, flange, screw coupling) with the injector portion 200. An injector recess 151 that comprises a threaded coupling 155 suitable for the operational service pressure and temperature is preferred. In some embodiments, the injector recess 151 also comprises a gasket gap 157 to permit the use of a gasket between the shaft section 105 and the injector portion 200 to seal the process from the external environment.

As viewed in the embodiment shown in FIG. 1(c), the shaft inner wall 111 forms an injector passage 159 along the shaft vertical axis 153 from the injector recess 151 of the shaft section 105 to the process fluid flow passage 113 of the block section 103 so that the injector passage 159 and the process fluid flow passage 113 are in fluid communication. The length of the injector passage 159 is measured from the downstream point of connection between the injector passage 159 and the injector recess 151 to the downstream point of connection between the injector passage 159 and the process fluid flow passage 113, which is also the closest point to the throat 143. The shaft inner wall 111 is typically circularly-sectioned, although other shapes may be used as necessary as depends on the configuration of the injector portion 200.

As shown in the embodiment of FIG. 1(c), the injector passage 159 intersects with the process fluid flow passage 113 at the constricting portion 133. In such embodiments, the shaft vertical axis 153 perpendicularly intersects the central process flow axis 115 upstream of the throat 143.

FIG. 2(a) shows a partial side view of an injector portion 200. FIG. 2(b) shows an axial cross-section view of lens tee portion 100 (similar to FIG. 1(c)) coupled with a side view of injector portion 200 to form an embodiment initiator injection nozzle. The injector portion 200 comprises an outer surface 201 and an inner surface 203. Preferably, injector portion 200 is shaped to couple with the lens tee portion 100. The injector portion 200 is further comprised of a connector section 205 and stylus section 207, although generally other shapes and configurations may be used. The injector portion 200 is preferably comprised of a single piece of metal; however, it may also be comprised of two or more materials fastened together using bonding techniques known to one skilled in the art appropriate for operational service pressures and temperatures.

As seen in FIG. 2(a), the inner surface 203 of the injector portion 200 forms an initiator fluid flow passage 219 along an injector central vertical axis 213 extending from an injector inlet 215 in the connector section 205 to an injector outlet 231 at a shaped injector tip 221 in the stylus section 207. In all embodiments, the initiator fluid flow passage 219 intersects the process fluid flow passage 113 in the constricting portion 133. The initiator fluid flow passage 219 is typically circularly-sectioned, although other shapes may be used.

In embodiments where the initiator fluid flow passage 219 is circularly-sectioned, the initiator fluid flow passage 219 has a fluid flow passage diameter 223, which may be from about 2 to about 3.5 millimeters. The fluid flow passage diameter 223 is preferred to be wide enough so that if a process disruption (for example, an ethylene decomposition), start up, or shut down activities causes a partial backflow of monomer (or comonomer) or polymer into the shaped injector tip 221 (and possibly further into the initiator fluid flow passage 219), the resultant material can be easily dislodged and expelled upon restarting the process without having to first disassemble and clean the initiator injection nozzle. A fluid flow passage diameter 223 that is too small is more likely to become clogged during process upset conditions, and therefore be unable to then dislodge or expel material from the initiator fluid flow passage 219.

In some embodiments, the outer surface 201 of the connector section 205 includes an injector seat 209 useful for sealing the injector portion 200 against the lens tee portion 100 to isolate the process. In some embodiments, the outer surface 201 at the injector seat 209 has a bevel 211 at an angle not perpendicular to the injector central vertical axis 213. The configuration and dimensions of the injector seat 209 may vary according to the dimensions and manner of connection (for example, welding, flange, screw coupling) with the injector recess 151 of the lens tee portion 100.

The outer surface 201 of the connector section 205 proximate to the injector inlet 215 includes an initiator source fitting connection 217. The dimensions of the initiator source fitting connection 217 may vary according to manner of connection with an initiator source (e.g., welding, flange, screw coupling). A threaded connection, as shown in the embodiment in FIG. 2(a), is preferred.

In embodiments using a two-component assembly, such as the embodiment shown in FIG. 2, the inner surface 203 and outer surface 201 in the stylus section 207 of the injector portion 200 form a stylus 225. The stylus 225 has a stylus outer diameter 227 that permits the stylus 225 to be inserted freely into the shaft inner wall 111. The stylus outer diameter 227 may be from about 6 to about 10 millimeters. Preferably, the stylus outer diameter 227 is such that the stylus 225 frictionally couples with the shaft inner wall 111 of the lens tee portion 100 so that so that the body 101 of the lens tee portion 100 can provide mechanical stabilization to the stylus 225. The velocity of the process fluid flow exerts tremendous force on exposed parts of the stylus 225 during normal and upset process events, such as ethylene decompositions. It is preferred that the stylus 225 remains relatively immobile.

In embodiments where the initiator injection nozzle is made from a single component, the shaft inner wall 111 may act directly as the initiator fluid flow passage 219. In such embodiments, the stylus 225 may take the form of a tube-like extension of the shaft inner wall 111. In such cases, the fluid flow passage diameter 223 in the stylus 225 may be the same diameter as the shaft inner wall 111. In other embodiments, the stylus 225 is a tube-like insert that is bonded or coupled with the shaft inner wall 111. In such embodiments, the injector outlet 231 at the end of the stylus 225 is still formed by the shaped injector tip 221.

Referring back to embodiments such as the one shown in FIG. 2, the ratio of the stylus outer diameter 227 to the fluid flow passage diameter 223 may be from about 1.8 to about 3.5, and preferably from 2.8 to about 3.4. The ratio indicates that the stylus 225 is a relatively thick tube versus its internal diameter. It is preferred that the stylus 225 is relatively thick for the same reasons as given for mechanically stabilizing the stylus 225, especially portions of the stylus 225 that are directly exposed to process fluid flow. In all embodiments the stylus 225 protrudes beyond the injector passage 159 so that the shaped injector tip 221 and part of the stylus 225 is located in the process fluid flow passage 113. A higher outer diameter to inner diameter ratio provides additional mechanical reinforcement against damage from prolonged exposure to process fluid flow as well as objects and debris potentially carried along in the process fluid.

The design of the stylus 225 and the shaped injector tip 211 and the support given by the body 101 of the initiator injection nozzle is especially important in situations where the system may suffer ethylene decomposition and the initiator injection nozzle is exposed to high and variable pressure and temperature conditions. During ethylene decomposition portions of the process system, especially near the area where the decomposition initiates, may be exposed to very high internal temperatures (1000 to 2000° C.), pressure surges (4000 to 5000 bar), and stagnant process fluid flow (compressors may go off-line). As safety systems automatically engage and the process is "vented" (usually through pressure-relief devices), depending on location, portions of the process fluid not yet affected by the system decomposition are pulled through the affected areas and act to cool the affected areas. Also depending on location, the process fluid may contain solid debris as a result of the decomposition, such as carbon particles, or polymer in various stages of production that has not reached separation or refining. During venting, the process fluid may travel in the opposite direction or through a bypass from its normal flow path. In such a situation where the process fluid is traveling in a reverse direction and under the influence of a pressure gradient of near atmospheric pressure at pressure-relief devices and above-normal system pressures, the process fluid may be traveling at a very high velocity (subsonic) through the system. A decomposition event may last from several seconds to several minutes, depending on the function of safety and control systems and human intervention.

Based upon the decomposition scenario given previously, the portion of the stylus 225 in the process fluid flow and the shaped injector tip 221 may be exposed to the following series of extreme conditions. First, the portion of the stylus 225 in the process fluid flow and the shaped injector tip 221 may be impacted by an initial pressure wave (a pressure "spike") from the start of a system-wide ethylene decomposition in one or more of the reaction zones. Next, the temperature of the process fluid near the initiator injection nozzle may quickly rise to decomposition temperature levels, especially if the process fluid flow halts and stagnates. In a worst-case scenario, a system-wide decomposition may occur in the reactor tube in such a manner where the entire reactor tube is isolated and not vented, halting flow throughout the entire reactor tube and permitting most the ethylene in the reactor tube to decompose in a stagnant environment. Exposure of the initiator injection nozzle to these temperatures may last from several seconds to several minutes depending on the next series of events. Next, system pressure relief devices activate, creating a pressure gradient across the system. After "venting" has started, the process fluid, now containing decomposition debris and solid polymer particles, flows towards the pressure relief devices at high speed. Depending on relative direction and the speed of the venting (that is, how quickly the system is fully depressurized), the portion of the stylus 225 in the process fluid flow and the shaped injector tip 221 may be exposed to a process fluid where the temperature varies from normal operating values to decomposition levels (and possibly alternating from one extreme to the other), contains solid polymer particles and decomposition debris, and passes by at high speeds for up to several minutes. It is preferable that the design of the portion of the stylus 225 and the shaped injector tip 221 be able to withstand such flow forces and temperature excursions without significant deformation or damage (for example, a bent or broken stylus; a particle-clogged injector outlet). It is highly preferable that the design of the initiator injection nozzle does not require removal or maintenance of the initiator injection nozzle after such a decomposition event.

The shaped injector tip 221 may take various forms; however, preferred designs of the shaped injector tip 221 are ones that help reduce drag and prevent backflow into the stylus 225 through the injector outlet 231. Reducing drag and preventing backflow impedes the formation of high molecular weight polymers on or in parts of the stylus 225. Preferred designs also resist significant aggregation of high molecular weigh polymers by being hydrodynamic, permitting the process fluid flow to move smoothly around the stylus 225 and the shaped injector tip 221 with minimal flow disruption at the point of highest initiator concentration in the process fluid flow (at the injector outlet 231 at the shaped injector tip 221). By preventing significant disruption in process fluid flow, the high concentration of initiator at this point is quickly moved away from the injector outlet 231 and not permitted to break down, initiate, and assist in forming high molecular weight polymers on and around the stylus 225 or the injector outlet 231. This prevents several undesirable effects, including initiator feed disruptions due to clogging of the stylus 225 or the shaped injector tip 221, poor quality control of the final product due to excessive high molecular weight polymer formation, and system mechanical issues with the formation and sloughing off of "chunks" of high molecular weight polymer, which may cause further process fluid flow disruptions if they become lodged in the system. With reliable initiator feed flow, system operations are steadier and unpredictable system upsets like ethylene decompositions can be more easily avoided.

Figure 2C:
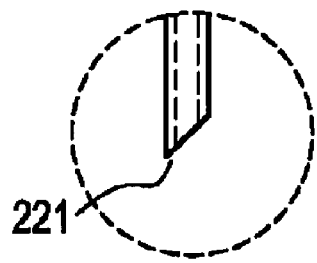
Figure 2D:
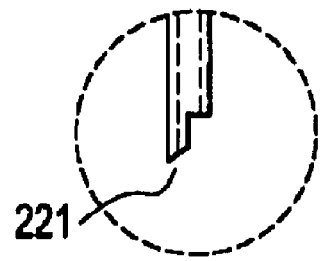
Figure 2E:
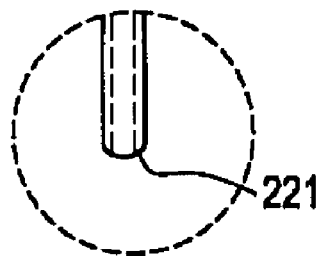
Figure 2F:
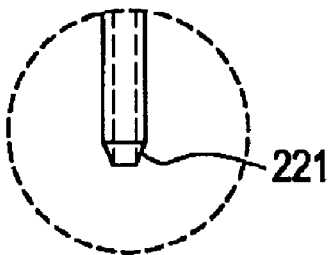

In some embodiments, such as shown in FIG. 2(a), the shaped injector tip 221 is flat, such as the end of a tube or pipe. In some embodiments, such as shown in FIG. 2(c), the shaped injector tip 221 may be an angular plane shape such as that of an injection "needle". In some embodiments, such as shown in FIG. 2(d), the shaped injector tip 221 may be a partial angular plane, where the leading portion of the shaped tip like a needle as discussed in FIG. 2(c), and the remainder may be a non-beveled shape, such as a stair step or square notch. In some embodiments, such as shown in FIG. 2(e), the shaped injector tip 221 may be "rounded" or is a dome shape. In some embodiments, such as shown in FIG. 2(f), the shaped injector tip 221 may be beveled. A variety of other forms of the shaped injector tip 221 are imaginable to one of ordinary skill and creativity in the art.

When using the components described and coupling them together—the lens tee portion 100 and an injector portion 200—an embodiment initiator injection nozzle is formed. The components may be coupled together using known coupling techniques for the pressure and temperature conditions of the process. For example, as shown in the embodiment of FIG. 2(b), a gland nut 250 may be configured so as to threadily connect to lens tee portion 100, frictionally connect to the injector portion 200, and tensionally connect the injector portion 200 to the lens tee portion 100. For the embodiment shown in FIG. 2(b), the direct tensional connection made using the injector seat 209 at intersection of the injector passage 159 and the injector recess 151 seals the process from the external environment.

For the embodiment initiator injection nozzle shown in FIG. 2(b), the injector central vertical axis 213 and the shaft vertical axis 153 overlap one another and are essentially the same.

In all embodiments, the stylus 225 at least partially containing the initiator fluid flow passage 219 and further comprising a shaped injector tip 221 forming the injector outlet 231 of the initiator fluid flow passage 219 protrudes into the process fluid flow passage 113 so that the injector outlet 231 is located in the constricting portion 133 of the process fluid flow passage 113. The stylus 225 protrudes far enough along the injector central vertical axis 213 so that the injector outlet 231 is located off the central process flow axis 115 by vertical offset 229 as determined along the injector central vertical axis 213. The stylus 225 protrudes into the constricting portion 133 by a protrusion distance, which is measured by the distance along the injector central vertical axis 213 from the injector outlet 231 to the intersection of the stylus 225 with the wall of the constricting portion 133. In all embodiment initiator injector nozzles, the protrusion distance is less than the radius of the constricting portion 133 at the injector central vertical axis 213 as measured from the central process flow axis 115.

The ratio between the radius of the throat 143 minus the vertical offset 229 and the radius of the throat 143, expressed in terms of the throat radius, offers a dimensionless measure between embodiment initiator injector nozzle designs that can show the potential impact of the stylus 225 extending into the process fluid flow on the throat 143. Since the stylus 225 is not extended through the process fluid flow passage 113 farther than the central process flow axis 115, the value of such a ratio is never 0 (which would indicate the injector outlet 231 is at the central process flow axis 115) or negative (which would indicate the stylus 225 extends beyond the central process flow axis 115). For embodiment initiator injection nozzles, the ratio is about 0.45 to about 0.90, and preferably from about 0.75 to about 0.90, indicating the injector outlet 231 is barely visible beyond the throat 143 if viewed from the downstream side of an embodiment initiator injector nozzle along the central process flow axis 115.

In all embodiments, the injector outlet 231 is located in the constricting portion 133 of the process fluid flow passage 113 upstream of the throat 143 by a horizontal offset 161 as determined along the central process flow axis 115. The horizontal offset 161 may be from about 6 to about 15 millimeters.

As can be seen in FIG. 2(b), non-zero values for both the horizontal offset 161 and the vertical offset positions the injector outlet 231 upstream of the throat 143 and slightly off the central process flow axis 115. The injector outlet 231 is positioned in embodiment initiator injection nozzles in such a manner so that initiator passing through the shaped injector tip 221 flows into and is swept along by the process fluid in such a manner that a high concentration of initiator is located proximate to the center of the process fluid (that is, central process flow axis 115) for a short period of time before the process fluid traverses the throat 143. Factors that are used to determine the necessary dimensions for the horizontal offset 161 and the vertical offset 229 include, but are not limited to, process fluid velocity at the injector outlet 231 and at the throat 143, initiator fluid velocity at the injector outlet 231, the temperature of the process fluid, the rate of decomposition from organic peroxides to free-radical bearing molecules at the process fluid temperature, and physical characteristics of the initiator injection nozzle such as the lens tee portion 100 and the injector portion 200. The ratio of the horizontal offset 161 to the vertical offset 229 is from about 1.0 to about 10, and preferably from about 1.1 to about 7.0.

The overall structure of the embodiment initiator injection nozzles make them much more operationally reliable and easier to clean and maintain than prior art nozzles. Because there is only one part—the stylus—that extends directly into the process fluid flow, there is no need to remove, repair, and reassemble the embodiment initiator injection nozzles after a process shutdown or upset other than what is done normally with the system itself. As previously discussed, the stylus in embodiment initiator injection nozzles is partially reinforced by the body of the nozzle itself and is preferably a thick gauge of piping so as to withstand process fluid flow forces, including upset conditions.

Various materials of construction of the initiator injection nozzle may be used as appropriate to withstand the rigors of the high operating pressures and maximum reactor temperatures of ethylene-based polymer production. It is preferred that the parts and components of the initiator injection nozzle, when assembled, be able to withstand and contain the process and decomposition products of an acute ethylene decomposition reaction. It is preferable that the materials used in the initiator injection nozzle are capable of withstanding not only normal operational temperatures and pressures but also the acute temperature and pressure excursions such as those seen during an ethylene decomposition. Preferable materials of construction include, but are not limited to, chrome steel alloys, titanium, nickel, MONEL™, and INCONEL™ (Specialty Metals Corp.; New Hartford, N.Y.).

An embodiment system incorporates at least one embodiment initiator injection nozzle in combination with other components to support a high pressure, free-radical initiated polymerization process using ethylene, and, optionally, at least one comonomer, to form a low density ethylene-based polymer product. An embodiment system may use a number of physical means to convert the reactants into the polymer product, such as and not in limitation of, a combination of one or more autoclaves and a tubular reactor, operated in series and in sequential order, or a single tubular reactor system.

For purposes of describing the invention's use in an embodiment system, a non-limiting description of a free-radical initiated low density ethylene-based polymerization reaction in an embodiment system (a tubular reactor process) is described. It is understood by one of ordinary skill and creativity that different types of reactor components, such as autoclaves and tubes, can be used in combination with one another in various setups (that is, series, parallel) to produce the product polymer. Besides feeding a tube reactor ethylene and, optionally, at least one comonomer, other components are fed to the reactor to initiate and support the free radical reaction as the ethylene-based polymer product is formed, such as reaction initiators, catalysts, solvents, and chain transfer agents.

Methods are well known in the art for using a system partially comprising a tubular reactor for forming a high pressure, low density ethylene-based polymer product. In such systems, a process fluid partially comprising ethylene is free-radically polymerized inside a tubular reactor in a highly exothermic reaction to form a product ethylene-based polymer product. The reaction occurs under high operating pressure (1000 bar to 4000 bar) during turbulent process fluid flow (hence low density ethylene-based polymers also referred to as "high pressure" polymers). Maximum temperatures in the tube reactor are typically from about 160° C. to about 360° C. and the reaction initiation temperature is from about 120° C. to about 240° C. Preheating of the process fluid before initiation and cooling of the process fluid after initiation typically occurs. Single-pass ethylene conversion values for a tube reactor process range from about 20 to about 40 percent. Modern tubular reactor systems also include at least one monomer recycle loop to further improve conversion efficiency.

Figure 3:
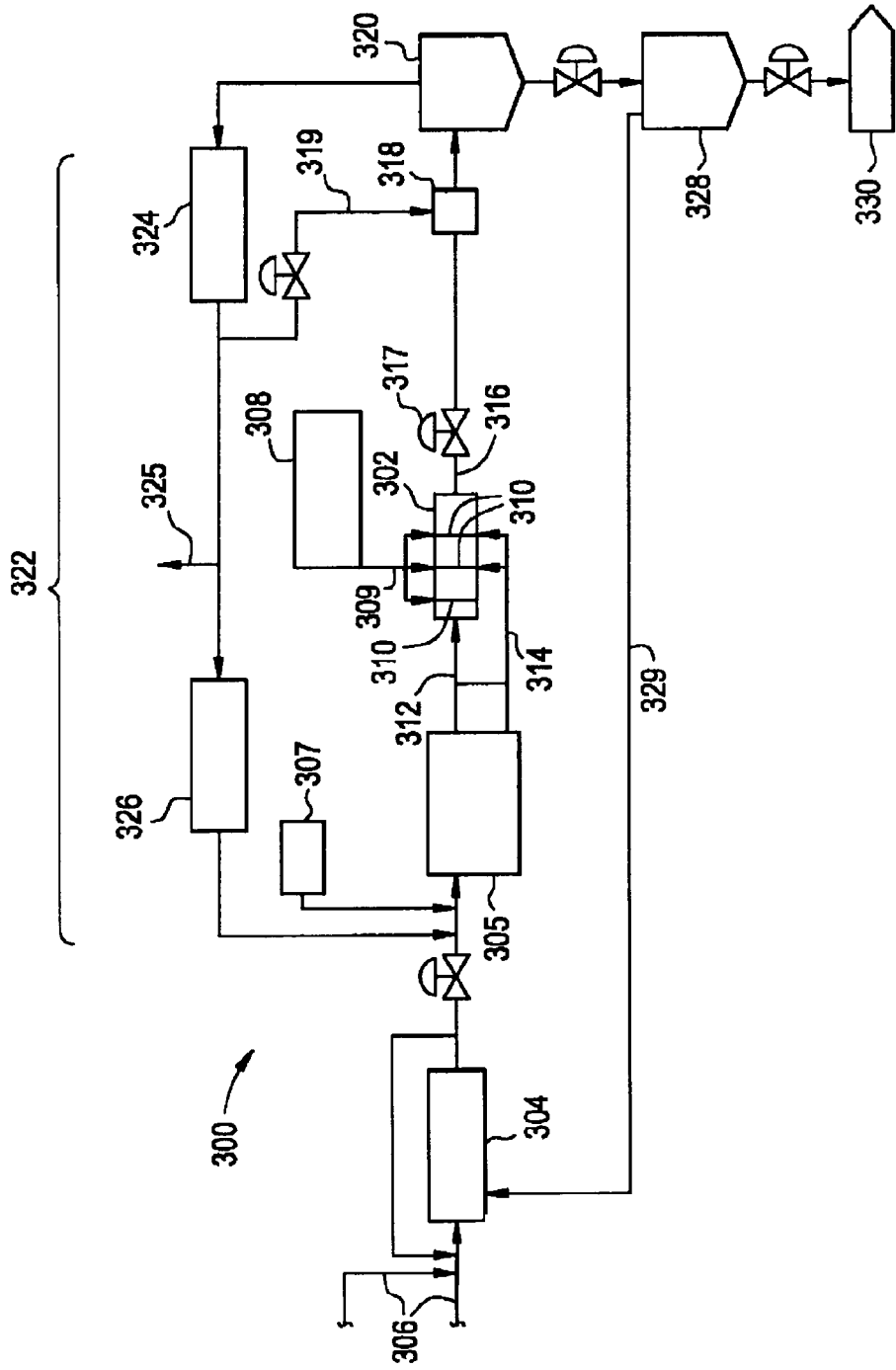
FIG. 3 is a diagram of an embodiment tube reactor system 300 comprising at least one embodiment initiator injection nozzle.

For the purposes of describing a system using the embodiment initiator injection nozzles, a non-limiting embodiment tube reactor system is shown in FIG. 3. An embodiment tube reactor system 300 containing a process fluid may comprise at least one fresh feed source 306 for supplying ethylene and optionally at least one comonomer into a process fluid, a primary compressor 304 for pressurizing the process fluid to reaction conditions in fluid communication with the at least one fresh feed source 306, a reactor tube 302 for converting a portion of the ethylene and optionally at least one comonomer within the process fluid into a low density ethylene-based polymer and a remaining portion of ethylene and optionally at least one comonomer in fluid communication with the primary compressor 304, a high pressure separator 320 for separating the low density ethylene-based polymer from the remaining portion of ethylene and optionally at least one comonomer in fluid communication with the reactor tube 302, and a recycle conduit 322 in fluid communication with both the primary compressor 304 and the high pressure separator 320 for conveying the remaining portion of ethylene and optionally at least one comonomer from the high pressure separator 320 to the primary compressor 304. Typically, however, modern systems use additional process components to achieve the temperatures, pressures, throughput, and efficiency necessary for global-scale high-pressure low density polyethylene production. Additional system components include, and as shown in FIG. 3, but are not limited to, a low pressure system recycle conduit 329, a secondary or "hyper" compressor 305, a chain transfer agent source 307, upstream process feed stream conduits 312 and downstream process feed conduits 314, initiator conduits 309, a reactor tube outlet 316, a high-pressure letdown valve 317, a jet pump 318, a jet pump recycle conduit 319, a low-pressure separator 328, an external recycle condenser 324, a high pressure recycle purification system 326, and a high pressure system purge vent 325. References that include further information on the described components and their use in high pressure low density polyethylene production include U.S. Provisional Application No. 61/103,374 (Karjala, et al.; filed Oct. 7, 2008) and PCT Patent Publication No. WO 2007/134671 (Cornelissen, et al.).

It is understood by those of ordinary skill and creativity in the art that the various components of tube reactor system 300 will be connected by conduits as appropriate for the flow of material between them. The conduits may include such auxiliary equipment such as valves, heat exchangers and sensors, not shown.

Referring to the embodiment initiator injection nozzle previously described and shown in part in FIGS. 1 and 2, process fluid is transported from an upstream part of the reactor tube 302, as shown in FIG. 3, through the body 101 of the lens tee portion 100 forming part of an injection nozzle 310 from the inlet end 117, through both the constricting portion 133 and the expanding portion 141, and out through the outlet end 119 back to a downstream part of the reactor tube 302. As the process fluid traverses through the constricting portion 133, the process fluid is compressed and the process fluid velocity increases.

As the process fluid traverses the injection nozzle, free radical initiator is continually injected into the process fluid. Initiator is transported from the initiator source 308 using conventionally known means into the injector portion 200 via the injector inlet 215. The initiator moves through the initiator fluid flow passage 219, through the shaped injector tip 221, and into the process fluid at a point upstream of the throat 143.

As the process fluid (now with initiator) transverses the throat 143 and into the expanding portion 141, the process fluid rapidly decompresses, resulting in a highly turbulent, non-laminar mixing zone that extends downstream from the throat 143 of the injection nozzle and into the reactor tube 302. Within this turbulent mixing zone, the initiator is rapidly distributed in the process fluid in a sheer mixing environment, breaking apart any localized high concentration of initiator leaving the shaped injector tip 215 before traversing the throat 143. This rapid dispersion of initiator using non-mechanical means and by minimizing the fluid drag impact of the injector 100 on the flow of the process fluid helps to prevent any localized buildup of highly reactive organic peroxides close to the point of initiator distribution. As previously stated, the buildup of highly reactive organic peroxides may under certain reaction conditions (and especially further downstream of the injection nozzle where the tube reactor system 300 temperature rises rapidly from previous free-radical polymerization reactions) touch off an ethylene decomposition.

The highly turbulent, non-laminar mixing zone not only has the effect of distributing the highly reactive organic peroxide initiator quickly throughout the process flow stream but also impacts the production of high molecular weight polymers by reducing the laminar flow layer near the wall in the expansion zone where the concentration of initiator is high. Because the flow of the process fluid is turbulent after traversing the throat 143, the laminar flow layer that forms against the inner walls of the expansion zone by fluid drag effects is significantly disrupted. Without a thicker, slower moving laminar flow regime in an area with high initiator concentration, the initial formation of high molecular weight polymers is impeded. This results in a polymer product that has better overall optical properties because it is known in the art that high molecular weight polymers cause negative optical properties such as haze and cloudiness. The prevention of high molecular weight polymer formation also results in a process with better heat transfer capacity since an insulative layer of product polymer does not form, which may further result in more efficient heat removal, better downstream initiator use, and better overall first-pass ethylene (and comonomer) efficiently.

Non-limiting examples of free radical initiators that may be used in the tube reactor system 300 include oxygen-based initiators such as organic peroxides (PO). Preferred initiators are t-butyl peroxy pivalate, di-t-butyl peroxide, t-butyl peroxy acetate, and t-butyl peroxy-2-ethylhexanoate, and mixtures thereof. These organic peroxide initiators are used in conventional amounts of between 0.01 and 2 weight percent, and preferably from 0.1 to 1 weight percent based upon the total weight of the fresh monomer feed.

In some embodiments, the free radical initiators are dissolved in organic solvents. Suitable solvents are, for example, aliphatic hydrocarbons such as octane or benzene, or intert solvents such as cholorbenzene, cyclohexane, or methanol. Example of organic solvents includes an n-paraffin hydrocarbon solvent (90-240° C. boiling range), an iso-paraffin hydrocarbon solvent (90-240° C. boiling range), and mineral oil-based solvents. The concentration of the organic initiator solutions may be from about 1 to about 90 weight percent, and preferably from about 5 to about 50 weight percent based upon the total weight of free radical initiators and organic solvents together.

In some embodiment systems, such as the one shown in FIG. 3, more than one embodiment initiator injection nozzle 310 may be used to initiate the free radical polymerization in reactor tube 302. Multiple initiation injection nozzles are known in the art to enhance conversion efficiency in free-radical high pressure low density polyethylene polymerization systems. In some embodiments systems where more than one initiator injection nozzle is used, the more than one initiator injection nozzles may be in fluid communications with more than one initiator source, such as, for the purposes of example, a first initiator source and a second initiator source. In some other embodiment systems where more than one initiator injection nozzle is used, one initiator injection nozzle is in fluid communication with a first initiator source exclusively. An example of such an arrangement is found in U.S. Provisional Application No. 61/103,374 (Karjala, et al.; filed Oct. 7, 2008).

In embodiment systems using at least one embodiment initiator injection nozzle, the single-pass ethylene conversion efficiency gain compared to an analogous system under corresponding conditions is greater than 0.5%, preferably greater than 1.0%, more preferably greater than 1.5%, and even more preferably greater than 2.0%, and most preferably greater than 3.0%.

The term "composition" describes an intimate mixture of materials as well as reaction products and decomposition products formed from interaction and reaction between materials that are part of the composition.

The term "ethylene-based polymer" refers to a polymer that contains more than 50 mole percent polymerized ethylene monomer (based on the total amount of polymerizable monomers), and, optionally, may contain at least one comonomer. A homopolymer of ethylene is an ethylene-based polymer.

The term "interpolymer" refers to polymers prepared by the polymerization of at least two different types of monomers. The term interpolymer includes copolymers, usually employed to refer to polymers prepared from two different monomers, and polymers prepared from more than two different types of monomers, such as terpolymers.

The term "LDPE" may also be referred to as "high pressure ethylene polymer" or "highly branched polyethylene" and is defined to mean that the polymer is partly or entirely polymerized in autoclave or tubular reactors at pressures above 13,000 psig with the use of free-radical initiators, such as peroxides (see, for example, U.S. Pat. No. 4,599,392 (McKinney, et al.)).

The term "polymer" refers to a compound prepared by polymerizing monomers, whether of the same or a different type of monomer. The term polymer embraces the terms "homopolymer" and "interpolymer".

The terms "steady state" and "steady state condition(s)" are a condition where properties of any part of a system are constant during a process. See Lewis, Richard J., Sr., *Hawley's Condensed Chemical Dictionary*, Wiley-Interscience (15th ed., 2007); also Himmelblau, David M., *Basic Principles and Calculations in Chemical Engineering*, Prentice Hall (5th ed., 1989).

The term "analogous" mean similar or equivalent in some respects though otherwise dissimilar. As used, "analogous" processes and systems use the same process equipment or system to make corresponding process runs except for the use of an embodiment device in at least one corresponding process run and the use of a comparative prior art device in at least one other corresponding run, in no particular order of comparison. For the purposes of demonstration in this application, the analogous processes and system differ by use of either an embodiment or a prior art first reaction zone initiator injection nozzle.

The term "corresponding" means like in a conforming respect. For a given free-radical low density ethylene-based polymer process, "corresponding" process runs means that for two or more process runs using analogous process equipment or systems, the difference between the peak temperature value for each analogous reaction zone (e.g., the first reaction zone peak temperature of Example 1 and the first reaction zone peak temperature of Comparative Example 1) at steady-state conditions is within 5%, preferably within 3%, more preferably within 1%, and most preferably within 1° C.

It is understood by one skilled in the art that in evaluating corresponding process runs in analogous processes or systems that process variables that are controlled and set to particular values (so called "master" variables, such as system pressure, ethylene to chain transfer agent feed split ratios, product melt index ($I_2$) target, ethylene feed rate, cooling medium flow rates and inlet temperatures), unless otherwise specified, are maintained at equivalent values during steady-state operations between corresponding process runs. It is also understood that non-controlled process variables and process variables that are subservient to controlled and set process variables (so called "slave" variables) may fluctuate in reaction to changing process conditions or to maintain the controlled and set process variables at their target values.

The basis for comparing corresponding process runs is for a period of at least 24 hours of steady-state conditions using 1 hour average data (as opposed to "spot data", which are individual data readings at specific points in time).

Melt index, or "MI" or $I_2$, is measured in accordance with ASTM D 1238, Condition 190° C./2.16 kg.

EXAMPLES

Corresponding process runs comparing performance between an embodiment initiator injection nozzle (the Example) and a prior art initiator injection nozzle (the Comparative Example) in a tube reactor system are shown. Reaction system data and calculated performance criteria are compared based upon operating analogous tube reactor systems at steady-state conditions using corresponding process runs.

The same overall tube reactor system setup is used for both corresponding Example and Comparative Example runs. The tube reactor system is modified between Example and Comparative Example process runs by only swapping out the first reaction zone initiator injection nozzle—no other physical modifications are performed. During Example process runs the Example initiator injection nozzle is used for the first reaction zone initiator injector nozzle. For Comparative Example process runs, the Comparative Example initiator injection nozzle is used for the first reaction zone initiator injector nozzle. The systems, therefore, are analogous.

The tube reactor system is similar in overall structure to the embodiment system shown in FIG. 3. The tube reactor system for the Examples and Comparative Examples contains a process fluid and comprises a fresh feed source of ethylene, a primary compressor, a secondary or "hyper" compressor, an initiator feed source, a chain transfer agent feed source, a reactor tube, a high-pressure letdown valve, a high pressure separator, a recycle conduit, a low-pressure separator, a low pressure system recycle conduit, a system purge vent, and all the necessary conduits and connections to interconnect the system components with one another. The reactor tube has at least two initiator injection nozzles along the length of the reactor tube and corresponding reaction zones extending downstream of each initiator injection nozzle.

The length of the reactor tube between the first initiator injection nozzle and the second initiator injection nozzle is 1540 feet (469.4 meters). The inner (working) diameter of the reactor tube at the inlet end of the first initiator injection nozzle is 2 inches (50.8 millimeters). The inner diameter of the reactor tube at the outlet end of the first initiator injection nozzle to the second initiator injection nozzle is 1.75 inches (44.5 millimeters).

The Comparative Example initiator injection nozzle has the physical characteristics listed in Table 1. The Comparative Example initiator injection nozzle may be described as an insert with a combination process flow channel of a cylindrical portion upstream of a single stylus protruding into the process flow channel and a constricting frusto-conical portion downstream. The cylindrical portion is 2.0 inches (50.8 millimeters) in diameter. The constricting portion is 2.0 inches (50.8 millimeters) in diameter at the stylus and shrinks down to 1.75 inches (44.5 millimeters) diameter. The stylus protrudes from the sidewall towards a central process flow axis at the point of intersection between the cylindrical and constricting sections. The stylus has an injector tip, and the injector tip is located away from the central process flow axis by a vertical offset. The Comparative Example initiator injection nozzle does not have an expanding portion after either the constricting portion or the stylus. The Comparative Example initiator injection nozzle does not have a throat or orifice plate or other flow restrictor.

TABLE 1

Dimensions of the Comparative Example initiator injection nozzle in inches (millimeters)

| Comparative Example Nozzle | Injector Diameter Inlet - in. (mm) | Injector Diameter Outlet - in. (mm) | Vertical Offset - in. (mm) | Stylus - in. (mm) | |
|---|---|---|---|---|---|
| | | | | OD | ID |
| Reaction Zone 1 | 2.0 (50.8) | 1.75 (44.5) | 0.625 (15.8) | 0.375 (9.5) | 0.0625 (1.6) |

The Example initiator injection nozzle has the physical characteristics listed in Table 2. It may be described as an insert with a process fluid flow channel having both a constricting and expanding frusto-conical portions meeting at a common circular throat with a single stylus protruding from the sidewall in the constricting frusto-conical channel portion towards the central process flow axis. The stylus is upstream of the throat of the injection nozzle by a horizontal offset. The stylus has an injection outlet formed by a shaped injector tip that is flat. The injector outlet is located away from the central process flow axis by a vertical offset.

TABLE 2

Dimensions of the Example initiator injection nozzle in inches (millimeters) and degrees

| Example Nozzle | Throat Diameter - in. (mm) | Exit Portion Diameter - in. (mm) | Entry Portion Diameter - in. (mm) | Expanding Length - in. (mm) | Horizontal Offset - in. (mm) | Process Fluid Flow Channel Length - in. (mm) | Vertical Offset - in. (mm) |
|---|---|---|---|---|---|---|---|
| Reaction Zone 1 | 1.0 (25.4) | 1.75 (44.5) | 2.0 (50.8) | 1.72 (43.8) | 0.25 (6.4) | 3.95 (100) | 0.10 (2.5) |

| Example Nozzle | Expanding Portion Angle - deg. | Constricting Portion Angle - deg. | Fluid Flow Passage Diameter - in. (mm) | Stylus Outer Diameter - in. (mm) | Constricting Length - in. (mm) |
|---|---|---|---|---|---|
| Reaction Zone 1 | 24.5 | 25.2 | 0.083 (2.1) | 0.24 (6.1) | 2.23 (56.6) |

Based upon the values given in Table 2, the ratio of the radius of the throat minus the vertical offset to the radius of the throat is 0.80, and the ratio of the horizontal offset to the vertical offset is 2.54.

Corresponding process runs Example 1 and Comparative Example 1 are run on analogous process systems using an Example and a Comparative Example initiator injection nozzle for the first initiation injection nozzle to produce a 0.25 MI ethylene-based polymer. The operating and process conditions are in Table 3.

"TPO" stands for t-butyl peroxy-2 ethylhexanoate, an organic peroxide initiator commonly used in free-radical ethylene-based polymer production. "DTBP" stands for di-t-butyl peroxide, also an organic peroxide initiator commonly used in free-radical ethylene-based polymer production. The initiator solvent used is an n-paraffin hydrocarbon solvent, a solvent with a 90-240° C. boiling range.

TABLE 3

Corresponding process runs Example 1 and Comparative Example 1 using Example and Comparative Example initiator injection nozzle for the first initiation injection nozzle to producing a 0.25 MI ethylene-based polymer.

| | Reactor Press | Reactor Peak Temp. | | Initiator Injection Temp. | | Pure TPO Flow | |
|---|---|---|---|---|---|---|---|
| | | 1st Reaction Zone | 2nd Reaction Zone | 1st Reaction Zone | 2nd Reaction Zone | 1st Reaction Zone | 2nd Reaction Zone |
| | | | | Units | | | |
| | (M psig) | (° C.) | (° C.) | (° C.) | (° C.) | (gal/hr) | (gal/hr) |
| Comparative Example 1 | 37.80 | 300.0 | 300.0 | 170.0 | 245.7 | 1.28 | 0.54 |
| Example 1 | 37.97 | 299.9 | 299.9 | 175.0 | 207.7 | 0.89 | 0.65 |

| | Pure DTBP Flow | | Solvent Flow | | | |
|---|---|---|---|---|---|---|
| | 1st Reaction Zone | 2nd Reaction Zone | 1st Reaction Zone | 2nd Reaction Zone | Total Hyper Flow | Jacket Water Temp. |
| | | | Units | | | |
| | (gal/hr) | (gal/hr) | (gal/hr) | (gal/hr) | (M lb/hr) | (° C.) |
| Comparative Example 1 | 0.20 | 0.24 | 15.10 | 15.11 | 103.05 | 139.0 |
| Example 1 | 0.30 | 0.47 | 14.89 | 14.75 | 103.37 | 139.0 |

Figure 4:
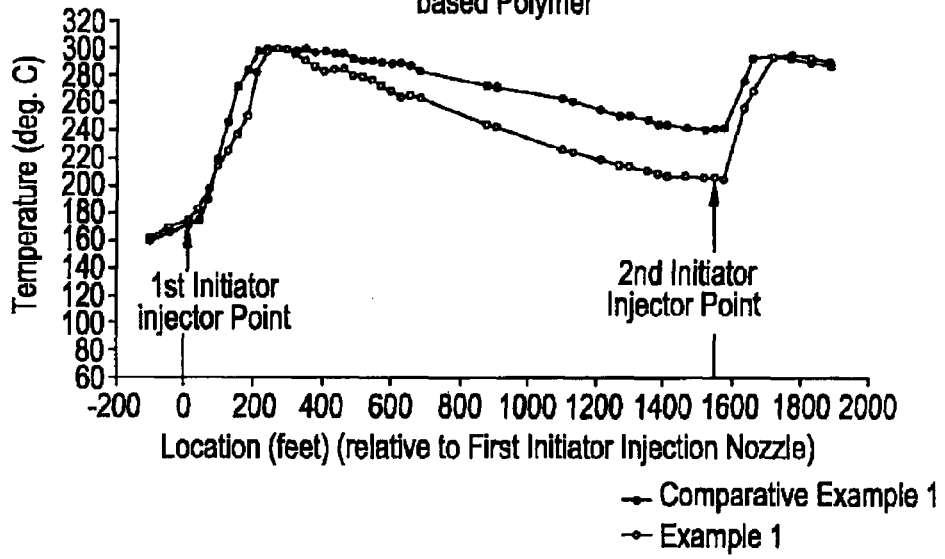
FIG. 4 is a chart of temperature versus distance from a first initiator injection nozzle to a second initiator injection nozzle for an analogous system under corresponding conditions using an Example and a Comparative Example initiator injection nozzle for a first initiation injection nozzle in producing a 0.25 MI ethylene-based polymer.

The temperature profiles for the corresponding process runs Example 1 and Comparative Example 1 are shown in FIG. 4. As can be seen in FIG. 4, the temperature decline for Example 1 from the first reaction zone peak temperature to the second initiator injection point is significantly steeper than the temperature decline for Comparative Example 1 under corresponding conditions. The corresponding initiator injection temperatures, reflective of the process fluid flow temperature at the point of initiator injection, at the second reaction zone show a significant difference of almost 40° C. (207.7° C. for Example 1 versus 245.7° C. for Comparative Example 1). The significant difference in the process temperature profiles seen in FIG. 4 and the second reaction zone initiator injection temperatures in Table 3 are attributable to greater heat removal from the process system for Example 1 versus Comparative Example 1. Because the Example nozzle provides better process fluid mixing after initiator injection than the Comparative Example nozzle, there is less formation of insulative high molecular weight ethylene-based polymer in the reaction zone downstream of the first initiator injection nozzle.

As can also be seen by examining the data in Table 3, because the heat removal from Example 1 process run greater (and therefore process system temperature is lower at the second initiator injection point) than during the Comparative Example 1 process run, more initiator may be used to achieve the same second peak reactor temperature (~300° C.) for the second reaction zone. The amount of TPO and DTBP used in Example 1 process run to reinitiate the reaction in the second reaction zone is significantly greater (0.65 gal/hr TPO and 0.47 gal/hr DTBP) than used for the analogous point in Comparative Example 1 process run. (0.54 gal/hr TPO and 0.24 gal/hr DTBP). The ability to use more organic initiators may result in an overall improvement in single-pass ethylene conversion.

Corresponding process runs Example 2 and Comparative Example 2 are run on analogous process systems using an Example and a Comparative Example initiator injection nozzle for the first initiation injection nozzle to produce a 2.3 MI ethylene-based polymer. The operating and process conditions are in Table 4.

Figure 5:
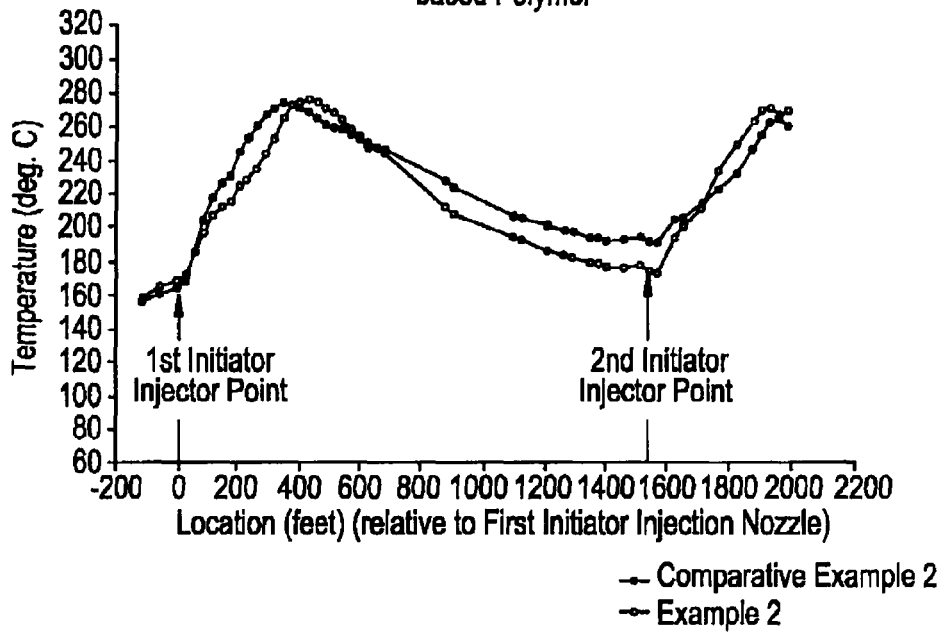
FIG. 5 is a chart of system temperature versus distance from a first initiator injection nozzle to a second initiator injection nozzle for an analogous system under corresponding conditions using an Example and a Comparative Example initiator injection nozzle for a first initiation injection nozzle in producing a 2.3 MI ethylene-based polymer.

The temperature profiles for the corresponding process runs Example 2 and Comparative Example 2 are shown in FIG. 5. As can be seen in FIG. 5, the temperature decline difference in the first reaction zone between Example 1 and Comparative Example 1 is similar to the decline seen between Example 2 and Comparative Example 2. The corresponding initiator injection temperatures, reflective of the process fluid flow temperature at the point of initiator injection, at the second reaction zone show a significant difference of almost 20° C. (177.3° C. for Example 2 versus 196.3° C. for Comparative Example 2). The amount of TPO and DTBP used in Example 2 process run to reinitiate the reaction in the second reaction zone is significantly greater (0.97 gal/hr TPO and 0.20 gal/hr DTBP) than used for the analogous point in Comparative Example 2 process run. (0.26 gal/hr TPO and 0.09 gal/hr DTBP). The ability to use more organic initiators may result in an overall improvement in single-pass ethylene conversion.

It is noted that for the Example 2/Comparative Example 2 runs that the jacket water temperature, which is the temperature of the water used to remove heat from the process, is significantly cooler for the Example 2 run versus the Comparative Example 2 run. Although intuitively it would seem that a process with cooler jacket water would be favored (that is, cooler heat removal medium creating a greater flux flow through the tube wall; absorption of more process heat; lower process fluid temperatures at the point of reinitiation; greater amounts of initiator can be used; ethylene efficiency gain), lower jacket water temperatures are known to cause fouling to occur sometimes within the matter of hours—in the reactor tube. It is believed that the improved mixing of the embodiment initiator injection nozzle prevented the formation of significant quantity of high molecular weight polymers in Example 2 that would have normally "plated out" at those jacket water temperatures under prolonged operating conditions.

All patents, test procedures, and other documents cited, including priority documents, are fully incorporated by reference to the extent such disclosure is not inconsistent with this invention and for all jurisdictions in which such incorporation is permitted.

TABLE 4

Corresponding process runs Example 2 and Comparative Example 2 using Example and Comparative Example initiator injection nozzle for the first initiation injection nozzle to producing a 2.3 MI ethylene-based polymer.

| | Reactor Press | Reactor Peak Temp. | | Initiator Injection Temp. | | Pure TPO Flow | |
|---|---|---|---|---|---|---|---|
| | | 1st Reaction Zone | 2nd Reaction Zone | 1st Reaction Zone | 2nd Reaction Zone | 1st Reaction Zone | 2nd Reaction Zone |
| | | | | Production Run Units | | | |
| | (M psig) | (° C.) | (° C.) | (° C.) | (° C.) | (gal/hr) | (gal/hr) |
| Comparative Example 2 | 37.83 | 275.9 | 275.9 | 165.9 | 196.3 | 1.23 | 0.26 |
| Example 2 | 37.98 | 279.5 | 279.5 | 170.0 | 177.3 | 0.89 | 0.97 |

| | Pure DTBP Flow | | Solvent Flow | | | |
|---|---|---|---|---|---|---|
| | 1st Reaction Zone | 2nd Reaction Zone | 1st Reaction Zone | 2nd Reaction Zone | Total Hyper Flow | Jacket Water Temp. |
| | | | Production Run Units | | | |
| | (gal/hr) | (gal/hr) | (gal/hr) | (gal/hr) | (M lb/hr) | (° C.) |
| Comparative Example 2 | 0.10 | 0.09 | 14.52 | 13.45 | 102.68 | 119.0 |
| Example 2 | 0.20 | 0.20 | 14.76 | 12.63 | 102.33 | 99.1 |

While disclosed embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth but rather that the claims be construed as encompassing all the features of patentable novelty which reside in the present invention, including all features which would be treated as equivalents thereof by those skilled in the art to which the invention pertains.

When numerical lower limits and numerical upper limits are listed, ranges from any lower limit to any upper limit are contemplated.

Depending upon the context in which values are described, and unless specifically stated otherwise, such values may vary by 1 percent, 2 percent, 5 percent, or, sometimes, 10 to 20 percent. Whenever a numerical range with a lower limit, $R_L$, and an upper limit, $R_U$, is disclosed, any number falling within the range is specifically disclosed. In particular, the following numbers (R) within the range are specifically disclosed: $R=R_L+k*(R_U-R_L)$, where k is a variable ranging from 0.01 to 1.00 with a 0.01 increment, i.e., k is 0.01 or 0.02 or 0.03 to 0.99 or 1.00. Moreover, any numerical range defined by two R numbers as defined above is also specifically disclosed.

As used and in the claims, the term "comprising" is inclusive or open-ended and does not exclude additional unrecited elements, compositional components, or method steps. Accordingly, such terms are intended to be synonymous with the words "has", "have", "having", "includes", "including", and any derivatives of these words.

The invention claimed is:

1. An initiator injection nozzle for mixing an initiator with a process fluid, comprising:
    a body comprising an inlet port to receive the process fluid, an outlet port, and an injector inlet to receive initiator;
    a process fluid flow passage through which the process fluid traverses between the inlet port and outlet port along a central process flow axis, further comprising a constricting portion, a throat, and an expanding portion in that order;
    an initiator fluid flow passage through which the initiator traverses between the injector inlet and an injector outlet along an injector central vertical axis, where the initiator fluid flow passage intersects the process fluid flow passage in the constricting portion;
    a stylus at least partially containing the initiator fluid flow passage and further comprising a shaped injector tip forming the injector outlet of the initiator fluid flow passage;
    where the injector outlet is located in the constricting portion of the process fluid flow passage and upstream of the throat by a horizontal offset as determined along the central process flow axis; and
    where the injector outlet is located off the central process flow axis by a vertical offset as determined along the injector central vertical axis.

2. The initiator injection nozzle of claim 1, where a ratio of the horizontal offset to the vertical offset is from about 1.0 to about 10.

3. The initiator injection nozzle of claim 1, where a ratio of the radius of the throat minus the vertical offset to the radius of the throat is from about 0.45 to about 0.90.

4. The initiator injection nozzle of claim 1, where the expanding portion angle is from about 23 to about 48 degrees.

5. The initiator injection nozzle of claim 1, where a ratio of the expanding portion angle to the constricting portion angle is from about 1.0 to about 3.0.

6. The initiator injection nozzle of claim 1, where the shaped injector tip comprises a needle-like shape.

7. The initiator injection nozzle of claim 1, where the shaped injector tip comprises a squared needle-like shape.

8. The initiator injection nozzle of claim 1, where the shaped injector tip comprises a rounded or domed-like shape.

9. The initiator injection nozzle of claim 1, where the shaped injector tip is beveled.

* * * * *